(No Model.)
A. CURRIER.
Hoeing Machine.
No. 239,369.  Patented March 29, 1881.
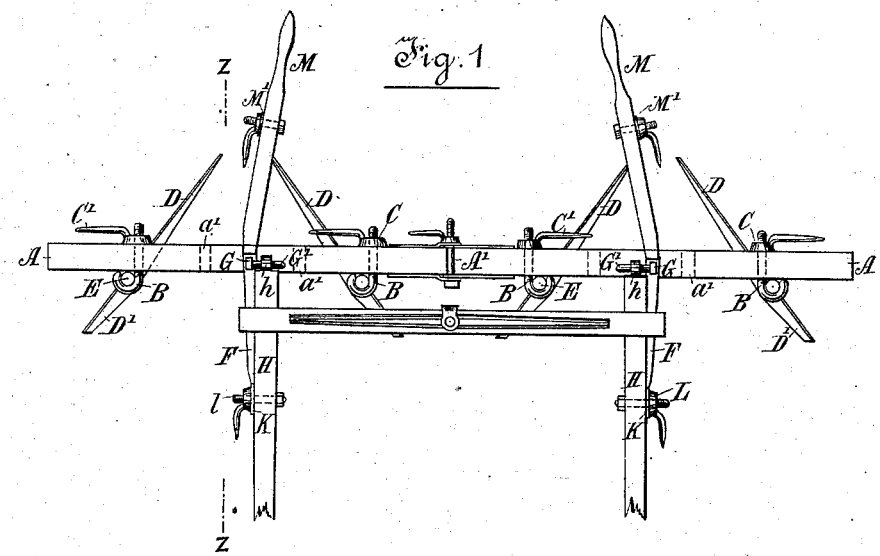
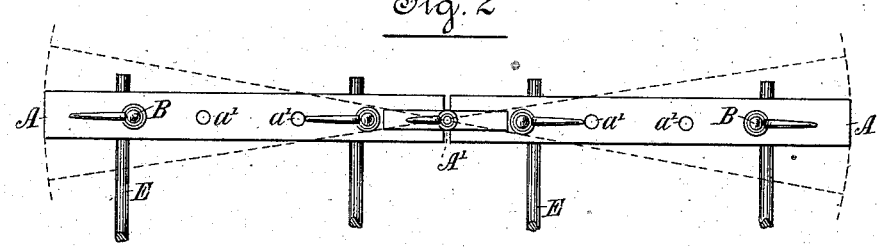
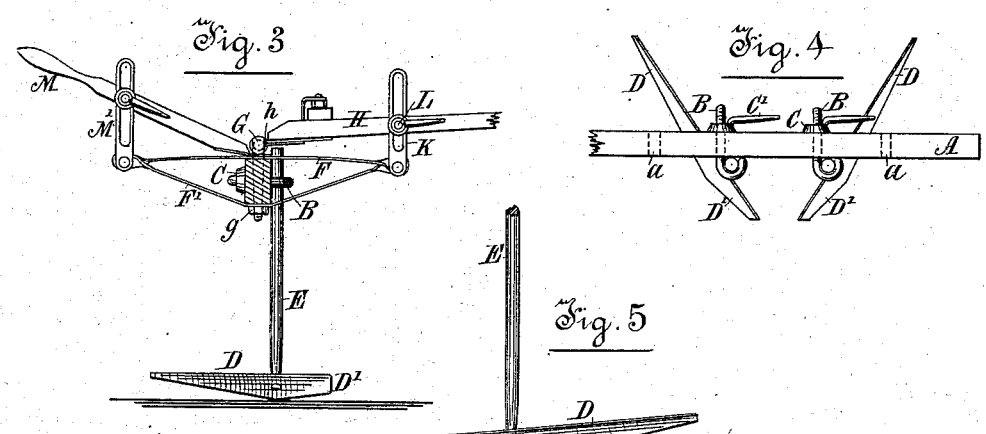
Witnesses:
Inventor:
A. Currier
Per Atty

UNITED STATES PATENT OFFICE.

AIKEN CURRIER, OF WILLSBOROUGH, ASSIGNOR OF ONE-HALF TO CHARLES W. WOODFORD, OF ESSEX, NEW YORK.

HOEING-MACHINE.

SPECIFICATION forming part of Letters Patent No. 239,369, dated March 29, 1881.

Application filed October 7, 1880. (No model.)

*To all whom it may concern:*

Be it known that I, AIKEN CURRIER, of Willsborough, Essex county, in the State of New York, have invented a certain new and useful Improved Hoeing-Machine; and I do hereby declare that the following is a full, clear, and exact description of the same.

My invention has reference to machines for ridging or hilling up rows of corn, beans, and other vegetables, and may be thus described:

To a main bar or frame, which is hinged in the center so as to follow the contour of the ground, are secured the hoes, these being held in place by the hooked ends of screw-bolts passing through the frame, and secured by nuts with handles, these hoes having their wing-springs projecting beyond the stocks to which they are attached, and these projecting portions having their front part beveled. The thills are attached loosely to the bar or frame, and are provided with means whereby their angle of inclination to the frame may be changed at will, so as to regulate the depth to which the hoes work.

For full comprehension of the invention reference must be had to the annexed drawings, in which Figure 1 is a plan view of the machine; Fig. 2, a part rear view of same; Fig. 3, a sectional elevation on line $z\, z$, Fig. 1; Fig. 4, a part plan, showing arrangement of hoes for removing the earth; and Fig. 5, a view of hoe.

Similar letters of reference indicate like parts.

A is the horizontal bar or frame, formed of two pieces hinged together in the middle, as shown at A', by a pin and eyes, or in any suitable way, the total length of this bar being generally enough to extend over two rows of the plants to be hilled up and to the center of the furrow on either side. Each half of the frame A is perforated, as shown at $a\, a\, a'\, a'$, and through the holes $a\, a$ pass bolts B, formed, as shown in Fig. 1, at one end into hooks, so as to hold the stocks of the hoes, (to be presently more particularly described,) and threaded at the other, so as to allow them to be screwed up by the nuts C, provided with handles C' for the purpose.

D are the wing-springs, shaped as shown in Figs. 3 and 5, riveted or otherwise secured at their broadest part, and at an angle to the stocks E, the broader end D' of these wing-springs projecting beyond its junction with the stock. These stocks or standards E are preferably formed of round iron, and roughened, scored, or corrugated at their upper ends, so as to give a firmer hold on the frame A.

F F' are bands of iron passing, respectively, over and under the frame A, as shown more particularly in Fig. 3, and secured thereto by bolts G, passing through same, and secured by nut $g$, to the upper end of these being secured, at right angles to same and parallel to frame, projections G', on which run eyes $h$, attached to the thills H H, of any usual construction. These thills H H are secured adjustably to the bands F F' by slotted links K, pivoted to their forward ends, through which pass bolts or pins $l$, tightened up and fastened by nuts L. The handles M are also secured adjustably to the rear ends of the bands F F' by means of slotted links M', (shown in Fig. 3,) through which pass pins, screwed up by handled nuts.

The operation of my invention will be so clearly understood from the foregoing and the drawings that it is only necessary to allude to the following points.

The shape of the wing-springs—viz., with the broader end projecting beyond the stock—does away with the necessity for outer hoes for each furrow, and the way in which they are attached to the frame allows them to yield when coming in contact with a heavy stone, &c., thus obviating any chance of breakage, the fastening allowing them to be easily adjusted or restored to position.

The construction of the frame A in two parts, hinged together, enables the machine to work on a ridge or in a hollow, all the hoes being brought to bear in either case, and the projections G' always holding the eyes $h$ of the thills, which slide along them.

Although the machine as represented and described will hoe up two ridges, the frame A may be very easily extended so as to carry another hoe beyond those shown, and thus form another half-ridge on either side.

To regulate the depth of soil to be thrown up, all that is required is to lower the front ends of the bands F F', so as to raise the rear ends of the hoes to the height desired, securing same by screwing up the slotted links K K to the thills at that point, and the handles being also adjusted by means of the links M', connecting them with the bands F F'.

In some instances, and specially in the cultivation of beans, which do not require much hilling up, it may be found desirable to remove some portion of the ridge, and in such cases this machine may be employed for the purpose, the parts being arranged as shown in Fig. 4— i. e., the hoes and bolts holding them in place are removed from the apertures $a\ a$ and placed in connection with those $a'\ a'$, the hoes themselves being reversed so that the angle of inclination of the wing-springs is outward, the broad ends D' being brought near together in front.

It will be obvious that the action of the machine so arranged will be to remove the superfluous earth—thus, in the case of beans, facilitating the pulling, and allowing the pods to hang from the vine, thus obviating any chance of their rotting or becoming blackened from contact with the ground.

It will be seen from the above that by my invention a hoeing-machine is produced at once cheap in original cost and easily repaired, effective in operation, and adjusted with facility, and which will operate equally well in the reverse way.

I am aware that hinged frames have been used for purposes analogous to those of my invention, and therefore do not claim same, broadly, nor in themselves slotted plates or links for varying the angle of penetration of the hoes; but What I do claim is as follows:

1. In a hoeing-machine, the combination, with the frame hinged centrally, of hoes secured adjustably to said frame, and means whereby they may be set more or less obliquely, and the bands F F', adjustable with the thills and the handles, substantially as described.

2. In a hoeing-machine, the bands F F', passing, respectively, above and below the frame, secured thereto by bolts G, and having pivoted to their forward ends vertical slotted links K, attached adjustably to thills, substantially as and for the purpose set forth.

3. In a hoeing-machine, the bands F F', secured to the frame, as herein described, and having pivoted to their ends vertical slotted links K and M', attached, respectively, to the thills H and handles M, and capable of adjustment, substantially as and for the purposes set forth.

4. The combination, with thills H, bands F F', and hinged frame A, of bolts G, passing through the same, and having on their upper ends projections G', as and for the purpose set forth.

AIKEN CURRIER.

Witnesses:
H. L. BARTHOLOMEW,
H. E. WOODFORD.